July 28, 1942.

H. J. BROWN 2,291,069

INVERTER CIRCUIT

Filed May 13, 1940

INVENTOR.
Harold J. Brown,
BY
Hood & Hahn.
ATTORNEYS.

July 28, 1942.  H. J. BROWN  2,291,069
INVERTER CIRCUIT
Filed May 13, 1940   2 Sheets-Sheet 2

INVENTOR.
Harold J. Brown,
BY
Hood & Hahn
ATTORNEYS.

Patented July 28, 1942

2,291,069

UNITED STATES PATENT OFFICE 2,291,069

INVERTER CIRCUIT

Harold J. Brown, Indianapolis, Ind., assignor to Electronic Laboratories, Inc., Indianapolis, Ind., a corporation of Indiana Application May 13, 1940, Serial No. 334,821

8 Claims. (Cl. 175—365)

The present invention relates to electric systems for converting direct current into alternating current by means of a vibratory switch.

More specifically, the invention relates to converters of the vibratory switch type for converting direct current into alternating current, and particularly to that type of inverter wherein the vibratory switch is used in connection with a transformer.

In systems of the above type and in inverters of the above type, a substantially square alternating current wave is developed. This wave consists primarily of fundamental frequencies and of harmonic frequencies developing, respectively, fundamental and harmonic currents. I have found, from experience and experiment, particularly where a low power factor load is connected to the inverter and a condenser is connected across the load for the purpose of correcting for a low power factor load, that the harmonic currents developed in the inverter adversely affect the operation of the inverter, causing excessive heating in the inverter, excessive sparking at the contact points of the vibrator switch, and, in fact are detrimental to the efficiency of the inverter as a whole. In other words, because of the presence of the harmonics, a condenser connected across the load is not effective in correcting for a low power factor load. It appears that the ineffectiveness of the condenser results from the fact that the condenser draws substantially no current when the contacts are closed, which constitutes the major part of the interrupting cycle.

The present invention relates to means for eliminating the harmonic currents in the inverter, to thereby increase the efficiency thereof.

Another object of my invention is to provide for restricting the flow of the harmonic currents to the condenser and thereby render the condenser effective in correcting for a low power factor load.

Another object of my invention is to provide for restricting the flow of the harmonic currents to the condenser and thereby render the condenser effective in correcting for a low power factor load by causing the condenser to draw a leading substantially fundamental current during the interval the contacts of the vibratory interrupter are closed and are supplying a direct current to the transformer.

Another object of my invention is to correct for a low power factor load.

For the purpose of disclosing the invention, I have illustrated certain embodiments thereof in the accompanying drawings, in which.

Figure 1:
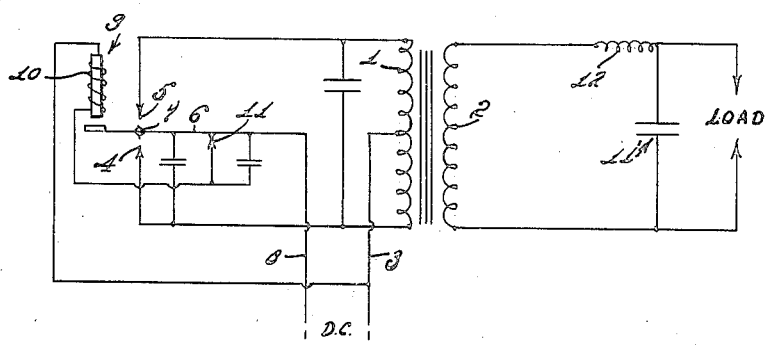
Fig. 1 is a diagrammatic view of a circuit arrangement embodying my invention.

Referring first to the arrangement illustrated in Fig. 1, I provide a transformer including a primary coil 1 and a secondary coil 2. The primary coil has a center tap 3 connected with one side of a source of direct current which may be an ordinary battery or some other source of direct current supply. The opposite terminals of the coil 1 are respectively connected to stationary contacts 4 and 5 disposed on opposite sides of a vibrator reed 6 provided with a contact 7. This reed 6 is connected to the opposite side 8 of the D. C. source.

The reed is vibrated through the instrumentality of an electromagnet 9, the coil 10 of which has one terminal connected to one side of the direct current line and the opposite terminal connected to a stationary contact 11, normally in contact with a contact on the reed 6. When current is initially passed through the electromagnet 9, it starts the reed 6 vibrating, which alternately opens and closes its own circuit, thereby maintaining the vibration of the reed and this vibration of the reed also causes the contact 7 to alternately engage contacts 4 and 5 thus alternately closing the circuit through the sections of the primary winding 1 in opposite directions, thereby setting up in the secondary winding 2 alternating current, which is delivered to the load. The load may be and usually is a load having a low power factor, and to correct or compensate for this low power factor load, my invention comprises an arrangement in which a condenser 11' is connected across the load. In inverters of this type, the alternating current wave developed thereby is a square wave including the foundamental frequencies and the harmonic frequencies which result in fundamental and harmonic currents. In order to choke out the harmonic currents thus developed and thereby render the condenser effective in correcting for a low power factor load, I connect, in series with the condenser 11', an inductance 12 which, developing an inductive impedance to the passage of the harmonic currents, prevents the passage through the condenser 11' of said harmonic currents, thereby preventing unnecessary heating of the transformer and associated parts. By eliminating the harmonic currents as above described, the condenser draws a loading substantially fundamental current during the interval the contacts of the vibratory interrupter are closed, as contrasted with the condition where the condenser drew substantially no current when the contacts were closed in the absence of the inductance 12. Thus, the insertion of an inductive impedance in series with the condenser renders the condenser effective in correcting or compensating for a low power factor load.

Figure 2:
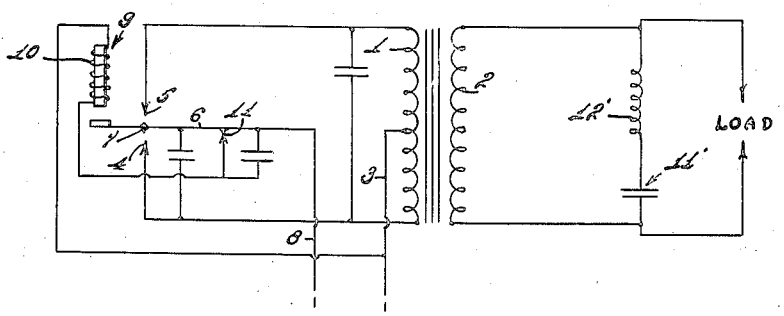
Fig. 2 is a diagrammatic view of a circuit arrangement of a modification thereof.

In the arrangement illustrated in Fig. 2, I have shown a modification wherein both the inductance 12' and the condenser 11' are connected across the low power factor load, the inductance, however, being in series, as shown, with the condenser 11'.

Figure 3:
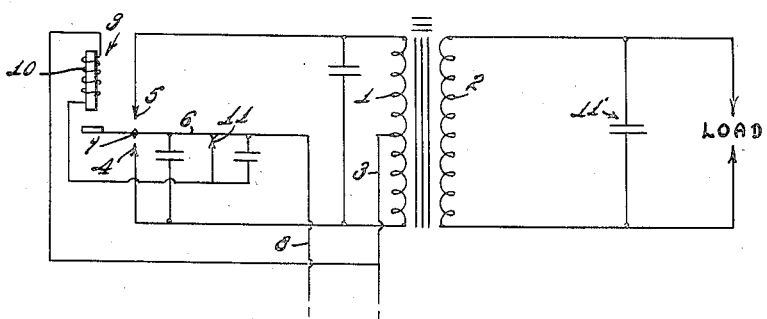
Fig. 3 is a diagrammatic view of a further modification thereof.
Figure 4:
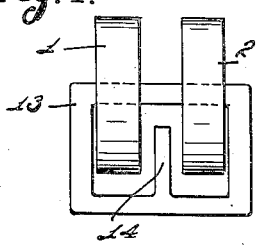
Fig. 4 is a plan view of the type of transformer used in the modification illustrated in Fig. 3.

In Fig. 3, I have shown another manner in which an inductive impedance may be developed in the circuit in series with the condenser 11'. In this arrangement, I use a transformer having a laminated substantially rectangular core 13 having wound thereon the primary winding 1 and the secondary winding 2. This type of transformer is provided with a leakage shunt, as 14, and this leakage shunt develops an inductive impedance in the circuit of the load, which inductive impedance is in series with the condenser 11'.

Figure 5:
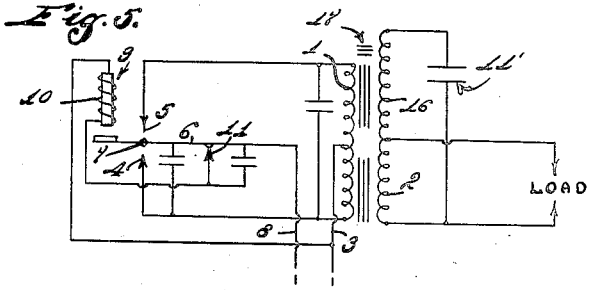
Fig. 5 is a diagrammatic view of a circuit arrangement of a still further modification of my invention.

In the arrangement illustrated in Fig. 5, another type of transformer is used, which, however, provides for the development of an inductive impedance in series with the condenser 11' which is connected across the low power factor load, as is the case in the other arrangements.

Figure 6:
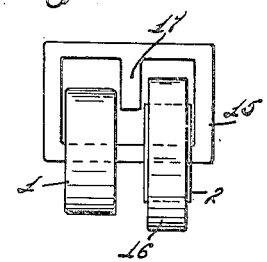
Fig. 6 is a plan view of the type of transformer which may be used in the circuit arrangement illustrated in Fig. 5.

In Fig. 6, I have illustrated a form of transformer which may be used in the circuit arrangement illustrated in Fig. 5. In this figure there is provided the laminated rectagular core 15 having mounted thereon the primary winding 1, the secondary winding 2 and a tertiary winding 16 which cooperating with the leakage shunt 17 of the core 15 is adapted to develop inductive impedance to the passage of harmonic currents through the condenser 11'.

Figure 7:
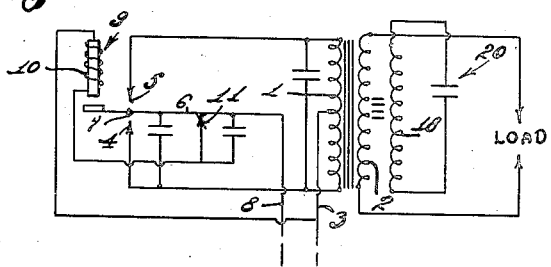
Fig. 7 is a diagrammatic view of a further modification.
Figure 8:
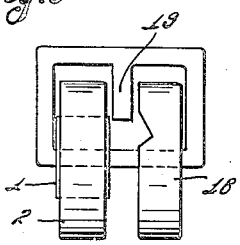
Fig. 8 is a plan view of a type of transformer used in the circuit arrangement illustrated in Fig. 7.

In the structure illustrated in Figs. 7 and 8, I have shown still a further arrangement wherein the tertiary winding 18 of the core of the transformer illustrated in Fig. 8 cooperating with the leakage shunt 19 of the core, develops an inductive impedance to the passage of the harmonic currents through the condenser 20 which, in this instance, operates in substantially the same manner as when the condenser is connected directly across the load, as has heretofore been the case.

Figure 9:
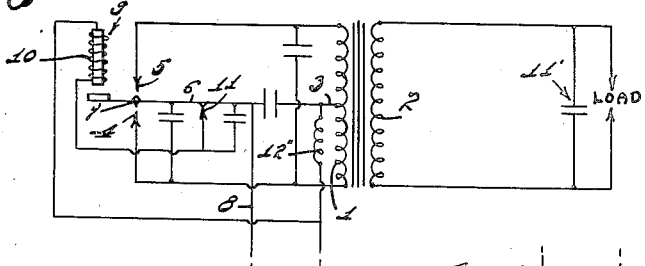
Fig. 9 is a diagrammatic view of a further modification.

In Fig. 9, I have illustrated a further modification, wherein the inductance 12" is connected in the center tap circuit of the transformer.

Figure 10:
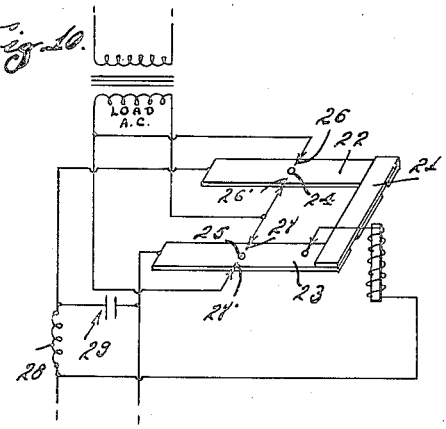
Fig. 10 is a diagrammatic view of a pole changer type of inverter embodying my invention.

In Fig. 10, I have illustrated a still further modification, wherein, instead of a transformer, I provide a pole changer for alternately reversing the current through the load. In this structure, the vibratory switch 21 is provided with two reeds, 22 and 23, operating in unison to cause their respective contacts 24 and 25 to alternately engage the sets 26 and 26' and 27 and 27' of stationary contacts for alternately closing the circuit from the direct current source to the load in opposite directions, thus producing in the load an alternating current. In this structure, it will be seen that an inductance 28 is connected in series with the condenser 29 connected across the load.

Figure 11:
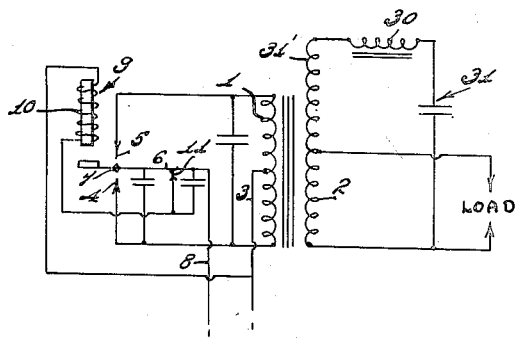
Fig. 11 is a diagrammatic view of a further embodiment of my invention.

In the arrangement illustrated in Fig. 11, the inductance 30 is connected in series with the condenser 31 which is connected across the load and in series with a portion 31' of the primary winding of the secondary winding 2.

In each of the above structures, however, it is to be noted that always I provide a means in series with the condenser which is connected across the low power factor load, means for developing an inductive impedance to the flow of harmonic currents in the condenser.

I claim as my invention:

1. In an electrical system for converting direct current into alternating current, said system having a transformer with input and output winding means and a vibratory interrupter having interrupting contacts for supplying an interrupted direct current to the input winding means of the transformer, the arrangement for correcting for a low power factor load connected to the output winding means, said arrangement comprising the combination of a capacitor connected in shunt with the output winding means, and inductance means for developing, in series with the capacitor, an inductive impedance to the flow of harmonic currents in the capacitor, said inductive impedance restricting the flow of the said harmonic currents to the capacitor and thereby rendering the capacitor effective in correcting for a low power factor load by causing the said capacitor to draw a leading substantially fundamental current during the interval the contacts of the vibratory interrupter are closed and are supplying a direct current to the input winding means of the transformer.

2. In an electrical system for converting direct current into alternating current, said system having a transformer with input and output winding means and a vibratory interrupter having interrupting contacts for supplying an interrupted direct current to the input winding means of the transformer, the arrangement for correcting for a low power factor load connected to the output winding means, said arrangement comprising the combination of a capacitor connected in shunt with the output winding means, and inductance means for developing, in series with the capacitor, an inductive impedance to the flow of harmonic currents in the capacitor, said inductive impedance restricting the flow of the said harmonic currents to the capacitor and thereby rendering the capacitor effective in correcting for a low power factor load by causing the said capacitor to draw a leading substantially fundamental current during the interval the contacts of the vibratory interrupter are closed and are supplying a direct current to the input winding means of the transformer, said inductance means comprising an inductance element connected in series with the capacitor and also in series with the load.

3. In an electrical system for converting direct current into alternating current, said system having a transformer with input and output winding means and a vibratory interrupter having interrupting contacts for supplying an interrupted direct current to the input winding means of the transformer, the arrangement for correcting for a low power factor load connected to the output winding means, said arrangement comprising the combination of a capacitor connected in shunt with the output winding means, and inductance means for developing, in series with the capacitor, an inductive impedance to the flow of harmonic currents in the capacitor, said inductive impedance restricting the flow of the said harmonic currents to the capacitor and thereby rendering the capacitor effective in correcting for a low power factor load by causing the said capacitor to draw a leading substantially fundamental current during the interval the contacts of the vibratory interrupter are closed and are supplying a direct current to the input winding means of the transformer, said inductance means comprising an inductance element connected in series with the capacitor and in shunt with the output winding means of the transformer.

4. In an electrical system for converting direct current into alternating current, said system having a transformer with input and output winding means and a vibratory interrupter having interrupting contacts for supplying an interrupted direct current to the input winding means of the transformer, the arrangement for correcting for a low power factor load connected to the output winding means, said arrangement comprising the combination of a capacitor connected in shunt with the output winding means, and inductance means in the transformer for developing, in series with the capacitor, an inductive impedance to the flow of harmonic currents in the capacitor, said inductive impedance restricting the flow of the said harmonic currents to the capacitor and thereby rendering the capacitor effective in correcting for a low power factor load by causing the said capacitor to draw a leading substantially fundamental current during the interval the contacts of the vibratory interrupter are closed and are supplying a direct current to the input winding means of the transformer.

5. In an electrical system for converting direct current into alternating current, said system having a transformer with input and output winding means and a vibratory interrupter having interrupting contacts for supplying an interrupted direct current to the input winding means of the transformer, the arrangement for correcting for a low power factor load connected to the output winding means, said arrangement comprising the combination of a capacitor connected in shunt with the output winding means, and inductance means for developing an inductive impedance to the flow of harmoic currents in the capacitor, said inductive impedance restricting the flow of the said harmonic currents to the capacitor and thereby rendering the capacitor effective in correcting for a low power factor load by causing the said capacitor to draw a leading substantially fundamental current during the interval the contacts of the vibratory interrupter are closed and are supplying a direct current to the input winding means of the transformer, said inductance means comprising an inductance element connected in circuit relation with, and impeding the flow of interrupted direct current in, the input winding means of the transformer.

6. In an electrical system for converting direct current into alternating current and supplying the latter to a load, said system including a vibratory interrupter having interrupting contacts for supplying an interrupted direct current to the said system, the arrangement for correcting for a low power factor load connected to the system, said arrangement comprising the combination of a capacitor, and a transformer having an input winding means connected to the vibratory interrupter and energized by the interrupted direct current, an output winding means supplying alternating current to the load, and a tertiary winding connected across and in closed circuit relation with the capacitor, said transformer developing, in series with the capacitor, an inductive impedance to the flow of harmonic currents in the capacitor, said inductive impedance restricting the flow of the said harmonic currents to the capacitor and thereby rendering the capacitor effective in correcting for a low power factor load by causing the said capacitor to draw a leading substantially fundamental current during the interval the contacts of the vibratory interrupter are closed and are supplying a direct current to the input winding means of the transformer.

7. In an electrical system for converting direct current into alternating current and supplying the latter to a load, said system including a vibratory interrupter having interrupting contacts for supplying an interrupted direct current to the said system, the arrangement for correcting for a low power factor load connected to the system, said arrangement comprising the combination of a capacitor, and a transformer having an input winding means connected to the vibratory interrupter and energized by the interrupted direct current, an output winding means supplying alternating current to the load, and a tertiary winding connected across and in closed circuit relation with the capacitor, said transformer developing, in series with the capacitor, an inductive impedance to the flow of harmonic currents in the capacitor, said inductive impedance restricting the flow of the said harmonic currents to the capacitor and thereby rendering the capacitor effective in correcting for a low power factor load by causing the said capacitor to draw a leading substantially fundamental current during the interval the contacts of the vibratory interrupter are closed and are supplying a direct current to the input winding means of the transformer, said transformer having a core with a leakage shunt flux path separating the tertiary winding from the input and output winding means.

8. In an electrical system for converting direct current into alternating current and supplying the latter to a load, said system including a vibratory interrupter having interrupting contacts for supplying an interrupted direct current to the said system, the arrangement for correcting for a low power factor load connected to the system, said arrangement comprising the combination of a capacitor, and a transformer having an input winding means connected to the vibratory interrupter and energized by the interrupted direct current, an output winding means supplying alternating current to the load, and a tertiary winding connected across and in closed circuit relation with the capacitor, and inductance means for developing, in series with the capacitor, an inductive impedance to the flow of harmonic currents in the capacitor, said inductive impedance restricting the flow of the said harmonic currents to the capacitor and thereby rendering the capacitor effective in correcting for a low power factor load by causing the said capacitor to draw a leading substantially fundamental current during the interval the contacts of the vibratory interrupter are closed and are supplying a direct current to the input winding means of the transformer, said inductance means comprising an inductance element connected in series with the capacitor and in closed circuit with the said tertiary winding.

HAROLD J. BROWN.